Figure 2:
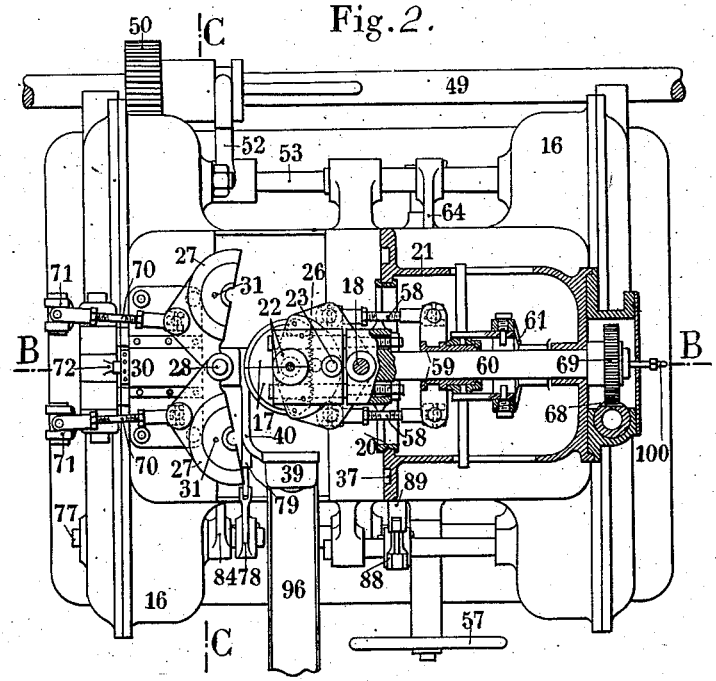

A. WILZIN.
AUTOMATIC GLASS WORKING APPARATUS.
APPLICATION FILED SEPT. 11, 1913.
1,174,217.
Patented Mar. 7, 1916.
7 SHEETS—SHEET 1.
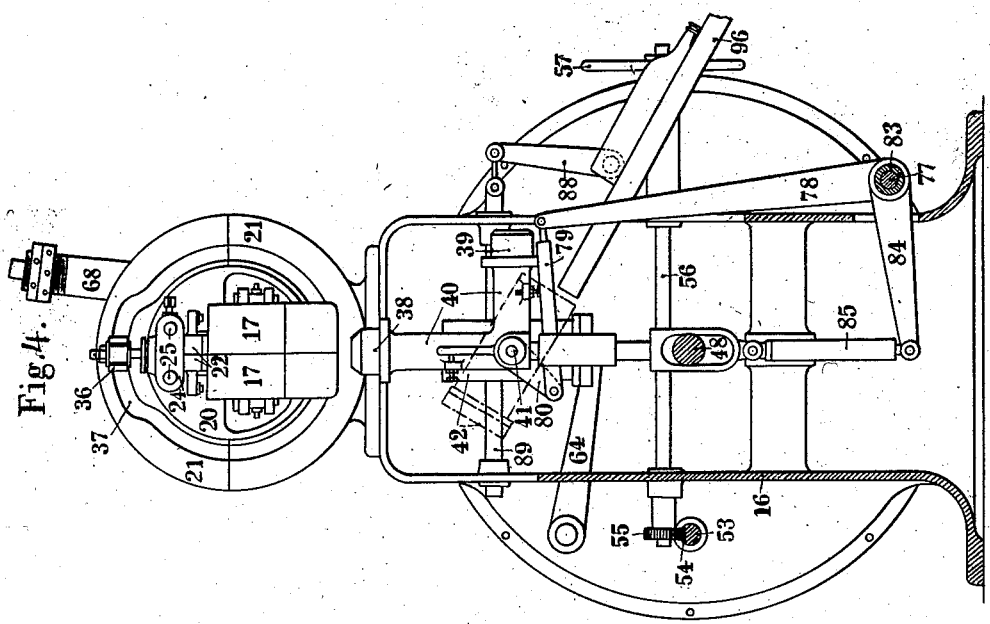
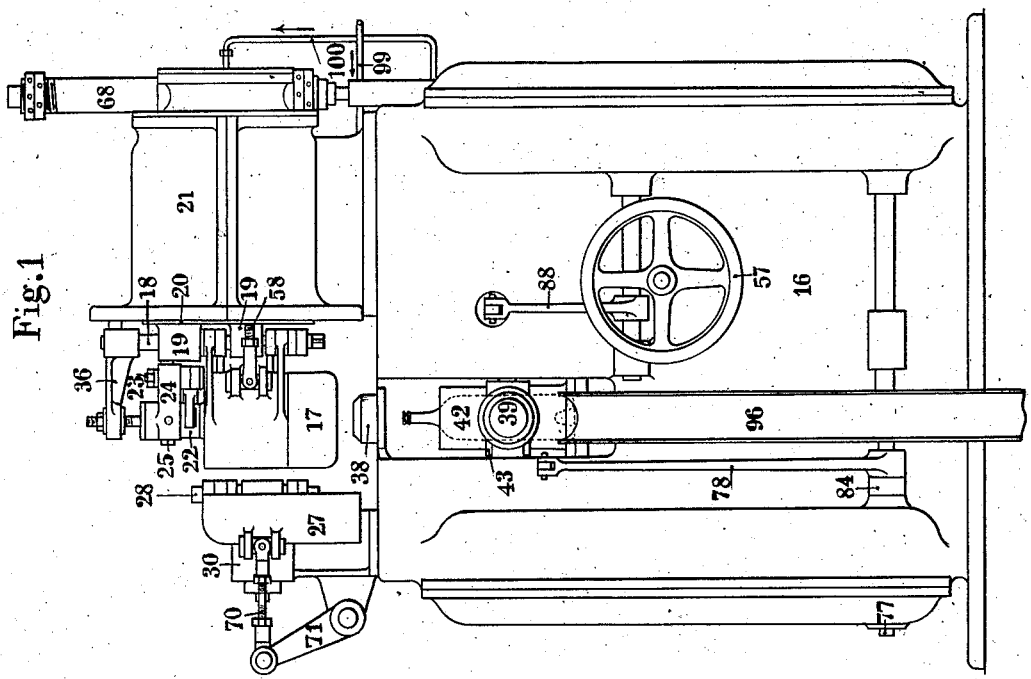
Witnesses:
M. F. Keating
Owen T. Bugg
Inventor
Arthur Wilzin
By his Attorney
Charles J. Kintner

A. WILZIN.
AUTOMATIC GLASS WORKING APPARATUS.
APPLICATION FILED SEPT. 11, 1913.

1,174,217.

Patented Mar. 7, 1916.
7 SHEETS—SHEET 2.

A. WILZIN.
AUTOMATIC GLASS WORKING APPARATUS.
APPLICATION FILED SEPT. 11, 1913.

1,174,217.

Patented Mar. 7, 1916.
7 SHEETS—SHEET 3.

Witnesses:
W. J. Keating
Owen N. Bugg

Inventor.
Arthur Wilzin
By his Attorney
Charles J. Kintner

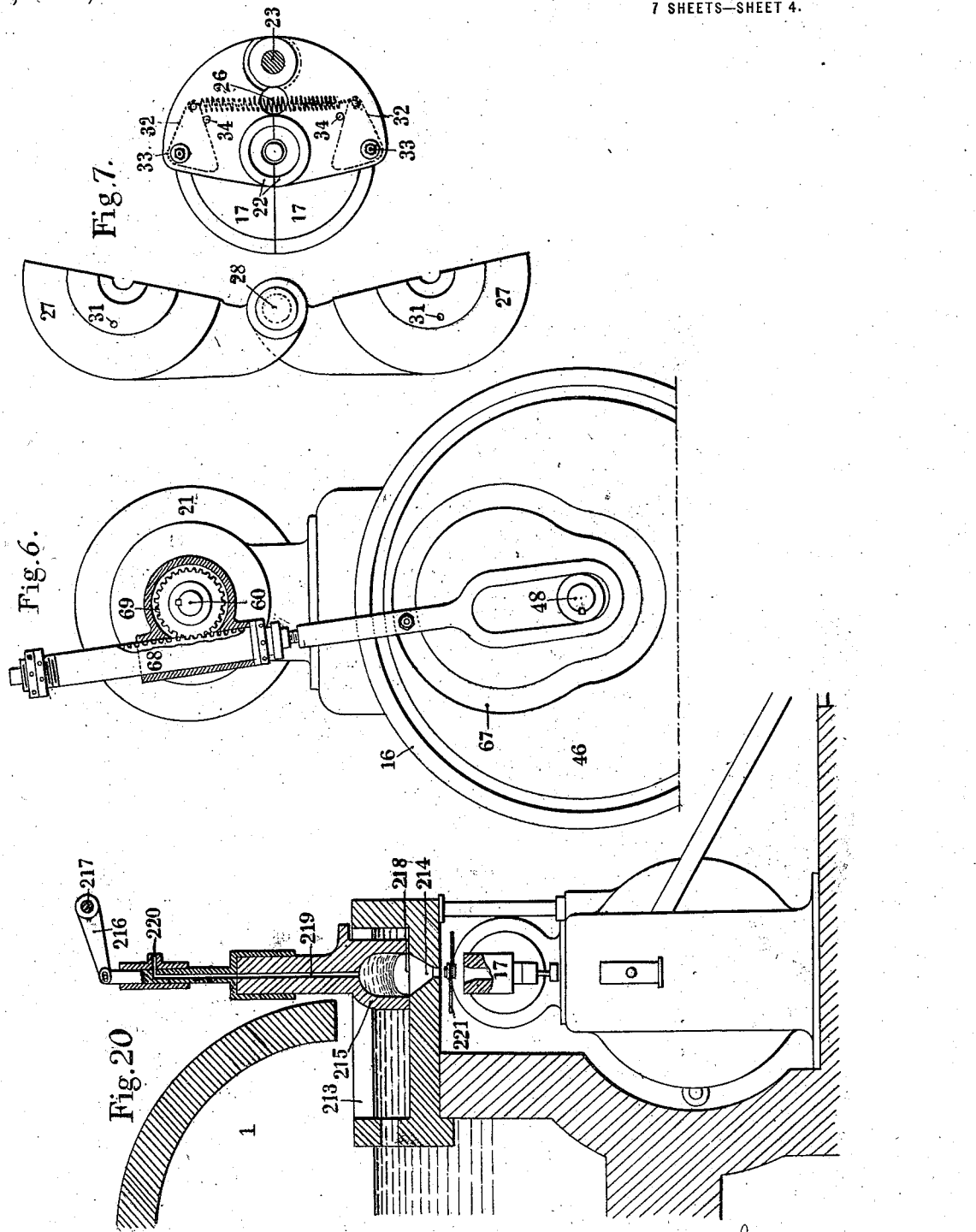

A. WILZIN.
AUTOMATIC GLASS-WORKING APPARATUS.
APPLICATION FILED SEPT. 11, 1913.

1,174,217.  Patented Mar. 7, 1916.
7 SHEETS—SHEET 5.

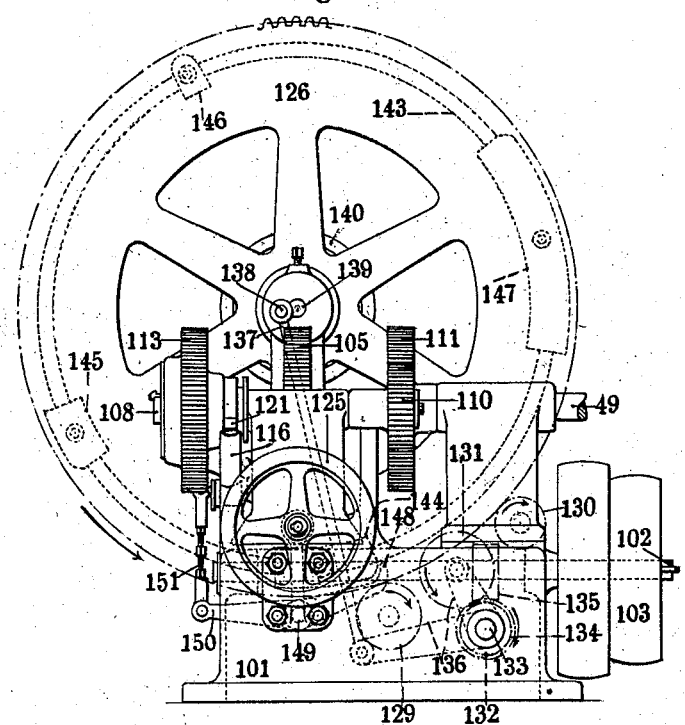
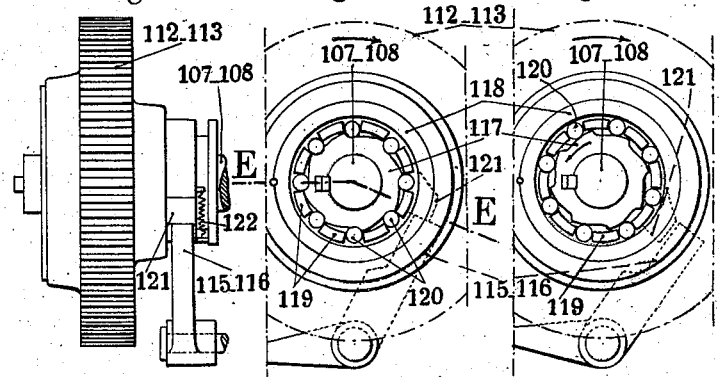
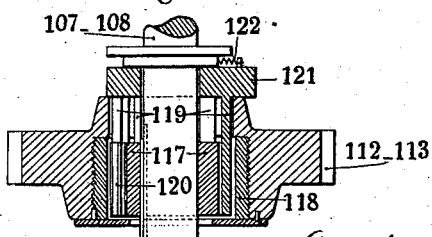

A. WILZIN.
AUTOMATIC GLASS WORKING APPARATUS.
APPLICATION FILED SEPT. 11, 1913.
1,174,217.
Patented Mar. 7, 1916.
7 SHEETS—SHEET 7.
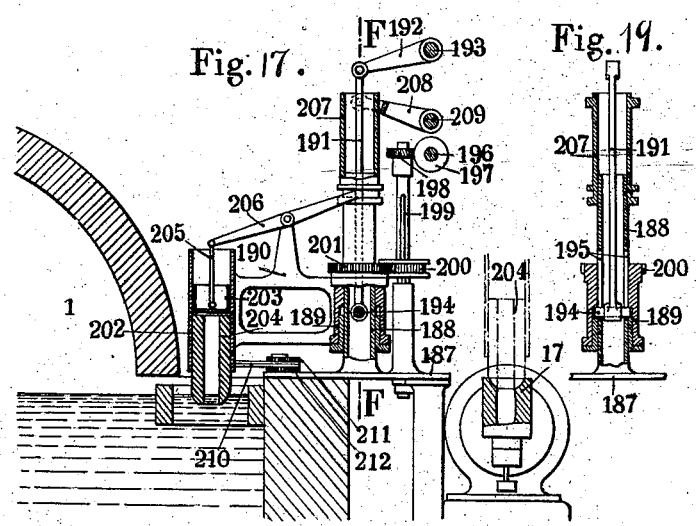
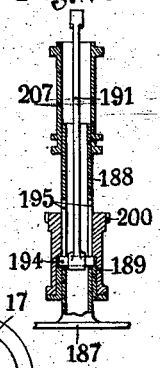
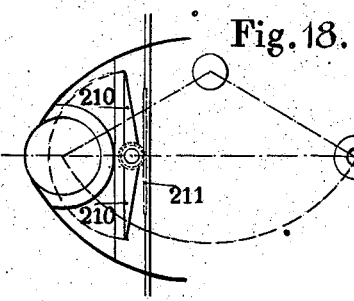

UNITED STATES PATENT OFFICE.

ARTHUR WILZIN, OF ST.-OUEN, FRANCE.

AUTOMATIC GLASS-WORKING APPARATUS.

1,174,217.  Specification of Letters Patent.  Patented Mar. 7, 1916.

Application filed September 11, 1913. Serial No. 789,257.

*To all whom it may concern:*

Be it known that I, ARTHUR WILZIN, a citizen of the United States of America, residing at 100 Boulevard Victor Hugo, St.-Ouen, Seine, in the French Republic, have invented a certain new and useful Improvement in Automatic Glass-Working Apparatus, of which the following is a specification.

This invention refers to improvements in automatic glass working machines of the type described in my United States Patent application Serial No. 685,547, and where the cams actuating the active organs of each molding or gathering unit are grouped in a separate machine common to an entire group, owing to which arrangement it becomes necessary to use a number of parallel shafts traversing each unit and thereby rendering it impossible to remove any of these units entirely without considerable disturbance, loss of time and labor. Moreover, owing to the multiplicity of these shafts it becomes lengthy and difficult to so clutch and unclutch the various devices of each unit to the several shafts as to be sure of retaining their proper relation to each other and to the actuating cams once they have been disconnected for the purpose of mold adjustment or repairs.

The purpose of this invention is to obviate these difficulties by means of constructive features which render it easy to stop, remove or replace each unit for setting molds or effecting repairs without interfering even momentarily with the continued performance of the others, and which withal, permit of easily changing the duration and sequence of the glass working phases to suit different heats and mixtures of the molten glass and the different weights of the bottles to be made. In order to obtain this, I provide each separate unit with cams which are in motion only during the kinematically active periods of the molds, being at a standstill during the glass working phases, (gathering, blowing, lengthening, shaping), the stopping and restarting of these cams being determined by a control device. The cams may thus be of comparatively small diameter, as they do not present the long circular portions which in ordinary cams correspond with the "dwell" periods of the active members, (such as molds, mold carriers and so forth); thereby reducing the cost and bulk of the machines.

The control device is designed to permit of varying at will the periods of stoppage of the molds during which the glass working phases take place, thus rendering it possible to utilize such various qualities and compositions of glass as are usually available and adapt the duration of the molding and blowing operations to the different heat conditions arising from the furnace and from the different weights of the objects to be molded.

The molding machines which I show in connection with the above devices possess several novel features, for instance:—(*a*) A double-bottom device actuated in such a manner that these bottoms respectively close the parison mold and the finishing mold at the proper moments. (*b*) A reversible cooling and ejecting pot which receives the bottle when it drops from the neck mold, and a device connected with same for pressing in the bottom of the bottle. This arrangement renders it possible to thoroughly cool the bottle before it leaves the machine, and much more thoroughly than if it were discharged directly from the finishing mold, and on the other hand, to obtain bottles with a pushed-in bottom without any additional handling or separate apparatus.

The invention also comprises automatic gathering apparatus controlled by means such as corresopnd with the spirit of the invention and combined in such a manner as to take the glass from the furnace and pour it, at the proper moments, into the parison molds of the molding machines.

A method of carrying the improved form of installation into practice is illustrated by way of example in the accompanying drawing, in which:—

Figure 5:
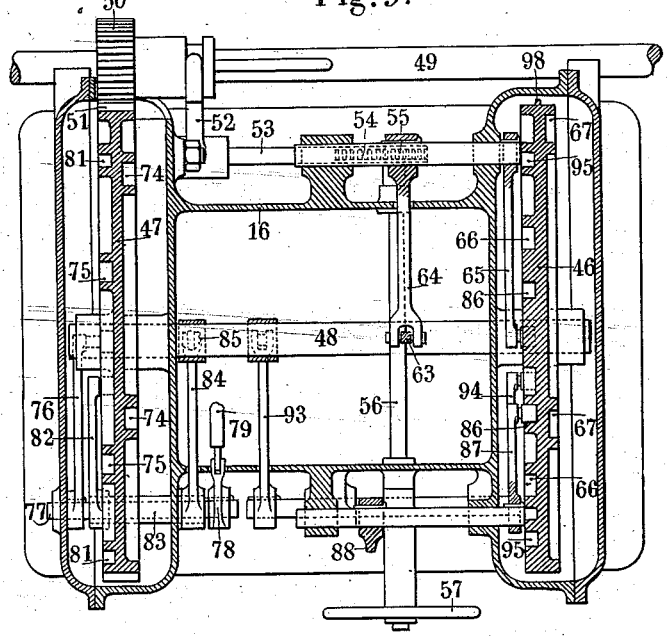
Figure 3:
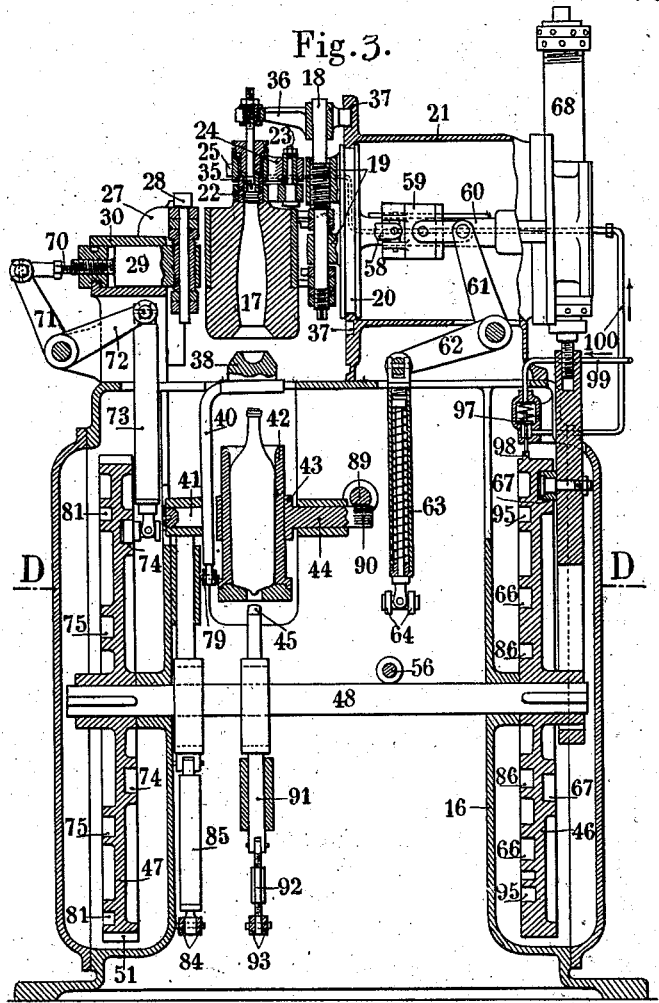
Figure 8:
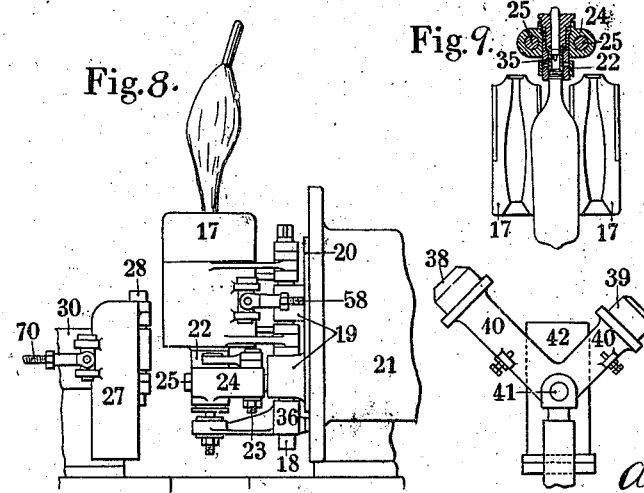
Figure 9:
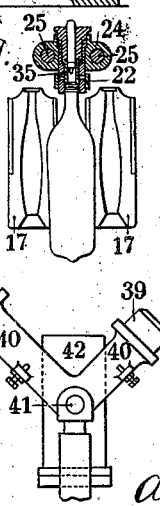
Figure 10:
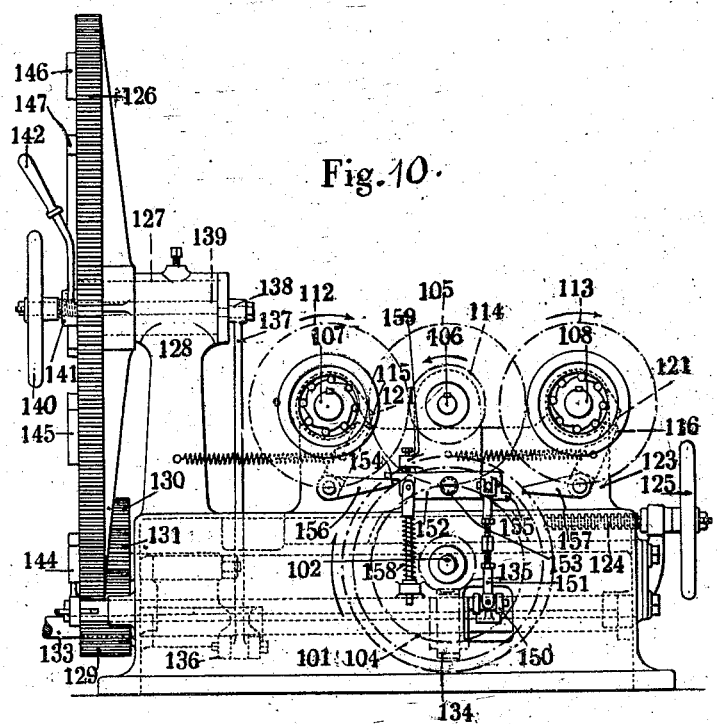
Figure 12:
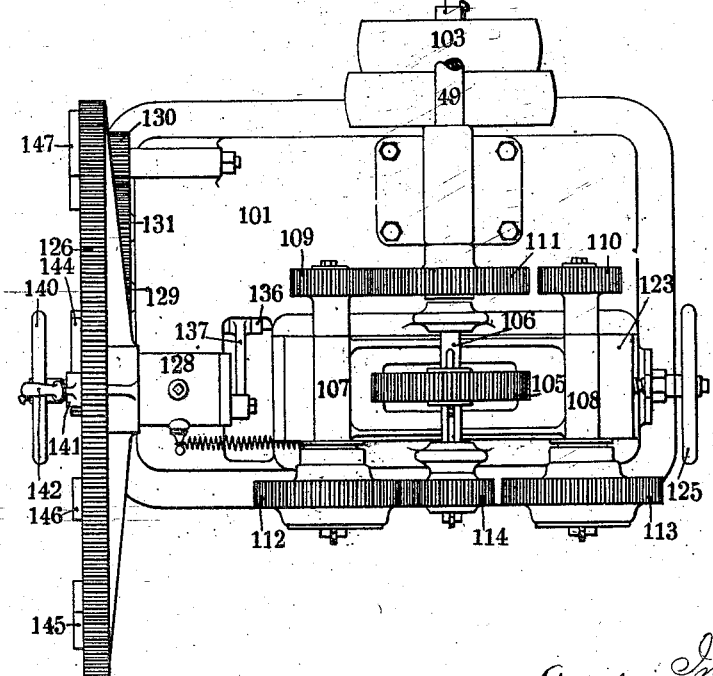

Figures 1 to 9, are detail views showing the arrangement of a molding machine; Fig. 1 is an elevation, Fig. 2 is a corresponding plan partly in section, Figs. 3 and 4 are two vertical sections respectively on the lines B—B and C—C of Fig. 2; Fig. 5 is a horizontal section on the line D—D in Fig. 3; Fig. 6 is a detail view of the mechanism controlling the rocking movement of the parison mold; Fig. 7 is a detail view, to a larger scale, showing the ring mold, the parison mold and the finishing mold in plan; Fig. 8 is an elevation of the parison mold in the position corresponding to the gathering operation, and Fig. 9 represents the blown bottle suspended from the ring mold at the moment at which it is about to fall into the receiving vessel. Figs. 10 to 12 represent the control apparatus controlling the molding machines; Fig. 10 is a side elevation, Fig. 11 a front elevation and Fig. 12 a plan view. Figs. 13 to 16 are detail views of a special form of clutch comprised in the present installation. Fig. 13 is an elevation of the clutch as a whole. Fig. 14 is a side elevation in the declutched position; Fig. 15 is a section on the line E—E in Fig. 14. Fig. 16 is a side elevation of the apparatus in the clutch position. Fig. 17 shows an automatic gathering apparatus in vertical section. Fig. 18 is a corresponding diagrammatic plan. Fig. 19 is a section on the line F—F in Fig. 17. Fig. 20 illustrates a modification of this automatic gathering apparatus in vertical section.

As shown in Figs. 1 to 9 each of the molding machines of the present installation is constituted in the following manner; at the upper part of a frame 16 a parison mold and a finishing mold are displaceably mounted. The parison mold comprises two shells 17 rotatable about a pivot 18; this mold is capable of rotating through 180° in such a manner that during the gathering it presents upward its extremity opposite to the neck of the bottle, as shown in Fig. 8; with this object the pivot 18 for this mold is carried by two bosses 19 presented by a rotary vertical disk 20, guided in the interior of a box 21; the control of this disk is hereinfter described. The parison mold 17 is provided with a ring mold comprising two shells 22 mounted in a mold carrier also composed of two parts rotatable about a common pivot 23. To permit of adjusting this ring mold relatively to the parison mold, the pivot of the two shells 22 is carried by a slide block 24 the position of which is adjustable upon two horizontal rods 25 mounted upon the bosses 19 of the rotary plate 20. The two shells 22 are constantly applied to each other under the influence of a spring 26. The opening of the ring mold is controlled by the finishing mold, as described below.

The finishing mold also comprises two shells 27 movable around a pivot 28 carried by a slide block 29 the position of which is adjustable inside a sleeve 30 upon the frame 16 of the machine. The two shells 27 of the finishing mold carry at their upper part two projections 31 intended to produce, at the proper moment, the opening of the ring mold 22 in acting upon two locking members 32 movable around pivots 33 carried by the two constituent parts of the ring mold 22, these two locking members, upon which the two extremities of the counter spring 26 are fixed, are retained by two stops 34. When the finishing mold 27 closes after the blowing of the parison, the two projections 31 encounter the locking members 32 cause them to rock in forcing them aside and come behind them; when, on the other hand, the finishing mold opens, the bottles being completely blown the two projections 31, in their angular displacement around the pivot 28, press back the locking members 32 which, by the intermediary of the stops 34 displace the two portions of the ring mold 22. At the moment at which the projections 31 escape the locking members 32 the two parts of the ring mold 22 close under the influence of the spring 26.

The mandrel 35, intended to be introduced into the ring mold 22 for forming the neck of the bottle, is adjustably mounted upon an arm 36 adapted to slide upon the extension of the pivot 18 upon which the parison mold rotates; this arm ends in a roller engaged in a cam groove 37 presented by the fixed body 21; during the movement of rotation transmitted to the parison mold 17 by the rotary plate 20 this cam imparts to the arm 36 and consequently to the mandrel 35, suitable vertical displacements for the introduction of the mandrel 35 into the ring mold and for disengaging it at the proper moments.

The bottom 38 of the parison mold 17 and the bottom 39 of the finishing mold 27 respectively are arranged below the molds; these two bottoms are mounted upon the two arms of an angle piece 40 carried by a trunnion 41 adapted to receive a movement of rotation and a reciprocating movement upward and downward, in such a manner that, at the proper moments it applies the bottoms 38, 39 against the parison mold 17 and the finishing mold 27, as hereinafter explained.

A receptacle 42 is arranged beneath the parison and finishing molds; this receptacle is arranged in such a manner as to receive the bottle at the moment at which it is released by the finishing mold 27 and the ring mold 22 and in which this bottle cools before being sent to the annealing furnace. This receiver 42 is mounted in a collar 43 carried by a trunnion 44 which is displaceable in bearings fixed to the frames; as hereinafter explained, this shaft is controlled in such a manner as to present the receiver axially of the finishing mold at the moment at which it is to receive a bottle and to rock it as shown in broken lines in Fig. 4, when the bottle after cooling, is to be sent to the annealing furnace.

The bottom of the receiving vessel 42 presents an orifice for the passage of the holing tool 45 for producing the reëntering bottom of the bottle while the latter is retained in the said receiver; this tool is given a movement of ascent and descent by means of a transmission device hereinafter described.

The different movements of the several parts of which the molding machine is constituted are controlled by the two cam plates 46, 47 keyed upon one and the same transverse shaft 48 mounted in bearings carried by the frame 16. These two cam plates 46, 47 as a whole receive their movement of rotation from a general transmission shaft 49 arranged along the battery of molding machines from a pinion 50 mounted upon the shaft 49 and meshing with teeth 51 presented by one of the cam plates 47 upon its periphery (Figs. 2 and 5).

In order to render optional the actuation of the machine, the pinion 50 while participating in the movement of rotation of the shaft 49 is displaceable along it in such a manner as to constitute a clutch element; the displacement of this pinion along the shaft 49 is controlled by a fork 52 carried by a sliding rod 53 provided with a rack 54 with which there meshes a pinion 55 keyed upon a shaft 56 carrying at its extremity a hand wheel 57. By operating this hand wheel 57 the rod 53 is displaced in one direction or the other, thereby clutching or declutching the pinion 50 and the teeth 51 of the cam plate 47.

It should be noted that by means of the drive described above, it is possible, as desired, to render a molding machine operative or inoperative without stopping the operation of the other machines.

The main transmission shaft 49 is given, from a control device hereinafter described, an intermittent movement of such a kind that this shaft is driven during the time in which the mechanical movements are to be effected and remains at rest during the periods of time occupied by the glass-working operations.

The cam plate 46 controls the opening and closing movements of the parison mold 17, its reversing movement, the rocking movement of the receiving vessel 42, the vertical movement of the holing tool 45 and the admission of the air or other fluid employed for the blowing. The cam plate 47 controls the opening and closing movements of the finishing mold 27, the vertical movement and the angular displacement of the bottoms 38, 39.

The opening and closing of the parison mold are controlled by the following mechanism: The two shells 17 of this mold are connected by adjustable rods 58 with a slide block 59 displaceable along the shaft 60 upon which the rotary plate 20 is keyed; this slide block is displaced by an arm 61 keyed upon the same shaft as an arm 62 connected by a compensating rod 63 with an arm 64 keyed upon the same shaft as the arm 65, the end of which is engaged in the slot 66 in the cam plate 46. The reversing movement of the parison mold is controlled by the cam slot 67 in which is engaged the extremity of a rack with compensating rod 68 meshing with a pinion 69 keyed upon the shaft 60 of the rotary plate 20 which carries this parison mold, as already explained.

The opening and closing of the finishing mold 27 are controlled by the following mechanism: The two shells of this mold are respectively connected by two adjustable rods 70 with two arms 71 keyed upon the same shaft as an arm 72, to the end of which a compensating rod 73 is jointed, the end of this rod carrying a roller engaged in a cam slot 74 of appropriate form formed on the cam plate 47.

The angular displacement and the vertical displacement of the angle piece 40, which carries the two bottoms 38 and 39, corresponding respectively with the parison and finishing molds, are controlled in the following manner: The angular displacement of this angle piece is controlled by a cam slot 75 of appropriate form in the cam plate 47 and in which is engaged the extremity of an arm 76 keyed upon a shaft 77 which carries another arm 78 connected by a compensating rod 79 with an arm 80 integral with the angle piece 40. Its vertical displacement is controlled by a cam slot 81 of appropriate form, also provided in the cam plate 47 and in which is engaged the extremity of an arm 82 keyed upon a sleeve 83 passed upon the shaft 77; this sleeve carries another arm 84 jointed to a compensating rod 85 the upper end of which ends in a collar into which the trunnion 41 of the angle piece 40 carrying the bottoms is introduced.

The rocking movement of the receiving vessel 42 is controlled by a cam slot 86 on the cam plate 46 and in which is engaged the end of an arm 87 keyed upon the same shaft as an arm 88, the end of which is connected, by a small connecting rod, with a rack 89 displaceable horizontally in collars presented by the frame of the machine and meshing with a pinion or a toothed member 90 carried by the trunnion 44 of the collar 43 into which the receiving vessel 42 is introduced.

The vertical movement of the holing tool 45 serving to form the reëntering bottom of the bottle is controlled in the following manner: This tool 45 is mounted at the end of a rod 91 appropriately guided and connected at its lower end by an adjustable rod 92 with an arm 93 keyed upon the same shaft as another arm 94 the end of which is engaged in a cam slot 95 of appropriate form in the cam plate 46.

The machine also comprises an inclined slideway or chute 96 into which the vessel 42 discharges the bottle in its rocking movement.

The admission of the compressed air or other fluid employed for the blowing of the bottles is regulated by a valve 97 controlled by a boss 98 arranged upon the periphery of the cam plate 46; the compressed air enters through the pipe 99 and is conducted through the conduit 100 to the point at which it is to be utilized for the blowing.

In cases in which the machine comprises two air inlets for air at different pressures for the parison mold and for the finishing mold and a canalization for forming a vacuum in the parison mold before the glass is poured therein, the cam plate 46 is also provided upon its periphery with three series of bosses corresponding to three different valves.

The operation of this molding machine is as follows: The molds occupying the position illustrated in Fig. 8, which corresponds to the gathering phase, the gathering operative pours the proper quantity of glass into the parison mold 17 through the wide extremity corresponding to the bottom which is directed upward at this time. During this operation, the main transmission shaft 49 receives no movement from the control mechanism; consequently the cam plate 46, 47 and the intermediate transmission parts remain at rest. When the time corresponding to the filling of the mold has elapsed, the transmission shaft 49 receives a movement of rotation from the control device hereinafter described and the cam plates 46 47 thus driven transmit in succession the following movements to the members of the molding machine. The parison mold 17 rotates through an angle of 180° and is brought into the position represented in Figs. 1 and 3; in this movement, the mandrel 35 withdraws from the ring mold 22 and gives access to the blowing fluid. The angle piece 40 carrying the bottoms receives in succession an angular displacement which conducts the bottom 38 into a line with the axis of the parison mold 17 and an upward movement for applying the bottom 38 against this parison mold. At this moment the shaft 49, and consequently the cam plates 46 and 47 come to rest and the boss 98 holds the valve 97 open; the parison is then blown. The cam plates 46 and 47 then receive from the shaft 49 a fresh angular displacement and cause in succession the descent of the bottom 38; its replacement at a lower level by the bottom 39 and the opening of the parison mold 17. The parison remains suspended from the ring mold 22; during a fresh period of stoppage of the shaft 49 and of the cam plates 46, 47, this parison becomes elongated and its lower part encounters the bottom 39 of the finishing mold 27 which, as already stated, has previously been arranged axially of the molds. The cam plates 46, 47 then receive a fresh angular displacement and the finishing mold 27 closes over the parison. The cam plates 46 47 again come to rest; during this period of stoppage, the admission of the compressed air or other fluid is opened and the final blowing of the bottle takes place. When this blowing is finished, the cam plates 46 47 are again driven and impart an angular displacement to the angle piece 40 which is brought into its intermediate position as shown in Fig. 9 in such a manner that the bottom 39 of the finishing mold moves completely aside, furthermore the finishing mold 27 opens, in this movement the two projections 31 carried by the shells of this mold, act upon the locking members 32 and cause the ring mold 22 to open as already explained. The bottle thus released falls into the receiving vessel 42 in which it cools. The holing tool 45 is raised, enters this receiver 42 and thus forms the reëntering bottom of the bottle and then returns to its initial position. The cam plates 46 47 then return to their point of departure in closing and reversing the parison mold 17, into the gathering position, Fig. 8, in this reversing movement, the mandrel 35 reëngages the ring mold 22 under the influence of the fixed cam 37. The receiving vessel 42 into which the previously formed bottle has fallen, rocks slightly before the completion of the manufacture of the next bottle and expels the cooled bottle into the inclined chute or conduit 96 which conducts it to the annealing furnace in the manner hereinafter described whereupon this vessel 42 returns to its initial position for the reception of the following bottle at the moment at which it is released by the ring mold 22. The mechanical phases and the glass working phases succeed each other in this manner, the mechanical members controlling the several elements of each machine being always stopped while the glass working phases are accomplished.

The shaft 49 which controls the entire battery of molding machines, receives an intermittent movement, as already explained, and is only driven during the periods when the mechanical movements are accomplished. This intermittent movement is communicated to this shaft 49 by a control device (Figs. 10 to 12) constituted in the following manner: The whole of the mechanism of this control apparatus is mounted upon a base plate 101; this mechanism comprises a driving shaft 102 upon which is mounted a pulley 103 which receives the movement of the engine; this driving shaft 102 transmits its movement by the intermediary of pinions 104, 105 to a counter shaft 106 in line with which the main transmission shaft 49 is mounted. Relationship is established between the shaft 106 and the shaft 49 at the moments at which the latter is to be driven by an automatically controlled clutch device hereinafter described. On either side of the shafts 106 and 49 two intermediate transmissions are symmetrically arranged; these can be employed optionally in such a manner that in case of injury to one of them the other can at once be rendered operative. Each of these intermediate transmissions comprises a shaft 107, 108 to one of the ends of which a pinion 109, 110 is keyed; this pinion can be engaged with a pinion 111 keyed upon the transmission shaft 49; at the other end of the shaft 107, 108 a gear wheel 112, 113 is loosely mounted; this wheel can be caused to mesh with a pinion 114 keyed upon the shaft 106. A clutch described below and controlled by a clutch finger 115, 116, actuated as hereinafter described, at the proper moments automatically renders the wheel 112, 113 fixed with the shaft 107, 108 upon which it is mounted.

The clutch intended for connecting the idle wheel 112, 113 continuously driven by the shaft 107, 108 to be controlled, comprises the following elements as shown in Figs. 13 to 16. A sleeve with inclined faces 117 keyed upon the shaft 107, 108 to be controlled. A ring 118 integral with the driving wheel 112, 113. A circular cage 19 carrying rollers 120 capable of establishing connection between the sleeve 117 and the ring 118 by wedging action. This circular cage 119 presents laterally a projection 121; a counter spring 122 which is fixed on the one hand to this projection and on the other hand to the shaft 107, 108 to be controlled, constantly tends to maintain the rollers 120 wedged between the inclines on the sleeve 117 and the ring 118.

Declutching is produced by the finger 115, 116 when it is brought into the path of the projection 121; in this position this finger forming an obstacle, stops the movement of rotation of the cage 119 and thus releases the rollers 120 (Fig. 14); the wheel 112, 113 is then able to rotate freely around the cage 119 and the shaft 107, 108 is no longer driven. In order to lock the wheel 112, 113 and the shaft 107, 108 it is only necessary to displace the finger 115, 116 in such a manner that it escapes the projection 121; the circular cage 119 under the influence of its counter spring 122 rotates upon the shaft 107, 108 in producing the binding of the rollers between the inclined faces of the sleeve 117 and the control 118 (Fig. 16).

The two transmission shafts 107, 108 are mounted upon one and the same carriage 123 displaceable in a slidway provided in the base plate 101 by means of a screw 124 rotating in a collar carried by the base plate and provided at its extremity with an operating wheel 125. By operating this hand wheel the carriage can therefore be displaced in either direction, thereby rendering one or other of the transmission shafts 107, 108 operative.

The finger 115 or 116 of the clutch rendered operative, is controlled by a control wheel 126 which receives a movement of continuous rotation from the driving shaft 102 through the following device. The control wheel 126 is loose upon a fixed shaft 127 mounted in a bearing 128, is toothed upon its periphery and is always in mesh with two pinions 129, 130, mounted idly upon fixed spindles. Pinion 130 carries, cast with it, pinion 130<sup>A</sup>. A planet pinion 131 may be made to mesh with either pinion 129 or 130<sup>A</sup>; this planet pinion is always in mesh with a pinion 132 around which it may be moved; this pinion 132 is keyed upon an auxiliary shaft 133 which receives a movement of continuous rotation at a reduced speed from the driving shaft 102 by the intermediary of the worm pinions 134 and 135. The planet pinion 131 is carried by one of the branches of a bent lever 136 rotatable about the shaft 133; the other branch of this lever is connected by a rod 137 with a crank arm 138 keyed upon a shaft 139 which passes through the hollow shaft 127 of the control wheel 126 and carries at its extremity an operating wheel 140. By the operation of this hand wheel 140, the lever 136 is directed in such a manner as to cause the pinion 131 to mesh optionally with the pinion 129 or with the pinion 130<sup>A</sup>; it is therefore possible to impart to the wheel 126 two different speeds. The shaft 139, and consequently the lever 136, can be locked in the desired position by means of a lock nut 141 provided with an operating lever 142; this nut is screwed upon a threaded portion of the shaft 139 and bears against the end of the fixed hollow shaft 127.

The control wheel 126, which, as already stated, receives a continuous slow movement of rotation, controls the stoppages and the startings of the transmission shaft 49 by means of the following device: This control wheel 126 presents laterally a circular slot 143 in which tappets 144, 145, 146, 147, of different lengths can be mounted as desired and fixed in an adjustable manner; these tappets act in succession upon an arm 148 keyed upon a shaft 149 carrying another arm 150 connected by an adjustable rod 151 with a lever 152 movable around a fixed pivot 153; at each of its ends this lever presents a projection 154, 155 serving to control the clutch of the transmission shaft 107 or 108 rendered operative in acting upon one or other of the arms 156, 157 respectively integral with the two clutch fingers 115, 116.

The two projections 154, 155 are arranged inversely as shown in Fig. 10 because one of them is intended to act during its upward movement and the other during its downward movement. A counter spring 158 tends to apply the lever 152 constantly against a fixed stop 159, which is the declutched position.

The operation of this control apparatus is as follows: The driving shaft 102 driven by the engine, rotates the pinions 114 and 131 continuously. The pinion 131 clutched either to the pinion 129 or to the pinion 130, according to the desired speed, transmits a movement of continuous rotation to the control wheel 126. A revolution of this control wheel corresponds with the cycle of operations comprised in the manufacture of a bottle; by means of the hand wheel 140 the pinion 131 is therefore caused to mesh either with the pinion 129 or with the pinion 130, according to the tempo required for the type of bottle being manufactured. The several tappets 144, 145, 146, 147 control the various phases of the mechanical movements described above and the length of the tappets corresponds with the duration of these phases; the intervals between the tappets correspond with the phases of the glass working proper such as the gathering, blowing the parison, elongation, blowing in the finishing mold and so forth. By their action upon the lever 148 the tappets impart an angular displacement to the finger 115 by the intermediary of the lever 150 as shown in Fig. 10 and thereby clutch the intermediate shaft 107 to the gear wheel 112; in these conditions the movement of the gear wheel 114 which is continuously driven by the driving shaft 102, is transmitted through the intermediate shaft 107 to the transmission shaft 49. These tappets and the intervals between them are established and arranged in such a manner as to impart to the shaft 49 the successive phases defined above of operation in correspondence with the several mechanical movements of the elements of the molding machine and of stoppage corresponding with the glass working phases. According to the qualities of the glass employed, this device renders it possible to vary the duration of the glass working phases by increasing or reducing the intervals between the tappets.

When the bottles leave the molding machine they are discharged, as previously stated, into inclined conduits or chutes 6 which conduct them to a furnace charging apparatus. This apparatus comprises essentially, as stated above; a receiving device which sets the bottles discharged from the inclined chutes 6 in a vertical position; a conveyer device which conducts these bottles opposite the mouth of the annealing furnace; a furnace-charging apparatus which deposits the bottles upon the endless apron passing through the furnace.

Figs. 17 to 20 illustrate, by way of example, two automatic gathering devices that can be employed.

The automatic gathering device represented in Figs. 17 to 19 comprises a base plate 187 surmounted by a hollow upright 188 upon which a sleeve 189 is able to turn and slide; this upright carries a gibbet 190. The vertical displacement of this gibbet along the upright 188 is controlled by a rod 191 jointed to an arm 192 keyed upon a shaft 193. This rod 191 displaces the sleeve 189 of the gibbet 190 by the intermediary of a pin 194 displaceable in two slots 195 formed in the upright 188 as shown in Fig. 19, the sleeve 189 of the gibbet presents a circular recess in which the two ends of the pin 194 engage and which permits of the rotation of this sleeve. The movement of rotation is transmitted to the gibbet 190 by a shaft 196 which, by the intermediary of two worm pinions 197, 198 displaces an auxiliary vertical shaft 199 upon which a pinion 200 is able to slide; this pinion participates in the movement of rotation of this shaft and meshes with a pinion 201 solid with the sleeve 189 of the gibbet. The gibbet 190 carries a cylinder 202 in which a piston 203 is displaceable, inside this cylinder, beneath the piston a suction tube 204 of any appropriate material is mounted. The piston 203 receives its movement by the intermediary of the rod 205 and of the lever 206 from a tube 207 adapted to slide upon the upright 188; this tube is displaced by an arm 208 keyed upon a shaft 209. The base plate also carries a pair of shears 210 for cutting the thread of glass produced by the drawing of the glass when it is gathered; the blades of this pair of shears carry respectively two pinions meshing with two operating racks 211, 212. The three shafts 193, 196, 209 and the racks 211, 212 receive intermittent movements controlled by cams operated at the proper moments by a control device similar to that already described.

The operation of this gathering apparatus is as follows: The apparatus occupying the position represented in Fig. 17, and the suction tube 204 entering the fused glass in the furnace 1, the shaft 209 causes the piston 203 to rise, under the influence of the vacuum thus produced, the glass rises in the tube 204 to an amount proportionate to the stroke of the piston 203; consequently, merely by modifying this stroke, it is possible to gather different quantities of glass with the same suction pipe. As soon as the piston has drawn the desired charge of glass, the shaft 193 which is then driven, causes the gibbet 190 to rise and also the suction pipe 204 which rises above the glass bath. During this upward movement of the suction pipe, the thread of glass issuing from the latter becomes drawn and diminishes in diameter. When the suction pipe has reached the highest point the shears 210 close and readily sever the thread of glass and without causing any prejudicial cooling by reason of the very small diameter of this thread of glass. The shaft 196 is started at this moment and rotates the gibbet 190 around the upright 188 and brings it above the parison mold 17 of the molding machine. During this displacement, the piston 203 receives a slight upward movement in such a manner as to create a slight diminution of pressure, thereby preventing the glass contained in the pipe 204 from falling under the influence of gravity. The gibbet 190 then receives a movement of descent which applies the pipe 204 to the parison mold 17; the piston 203 then descends and forces the charge of glass into this mold. The gibbet 190 then rises and resumes its initial position in bringing the suction pipe above the furnace to take a fresh charge of glass.

Fig. 20 shows another type of automatic gathering apparatus that can advantageously be employed. Above each molding machine the furnace 1 comprises an auxiliary reservoir 213 of small capacity presenting a tapping orifice 214 arranged axially of the parison mold 17 as shown in Fig. 20. This auxiliary reservoir communicates constantly with the furnace 1. This tapping orifice 214 is closed by a plug 215 which is raised during the tapping; this plug is operated by an arm 216 keyed upon a shaft 217 passing over the entire battery of machines and actuated by a cam which receives an intermittent movement from a suitably controlled clutch. The obturator 215 presents a cavity 218 into which a passage 219 opens, this passage ends at its upper part at a lateral orifice which moves inside a guide provided with a port 220 connected with a vacuum producing apparatus. Shears 221 are arranged beneath the pouring hole. The operation of this gathering device is as follows: The apparatus occupying the position represented in Fig. 20 at the moment at which the glass is to be poured into the parison mold 17 the obturator 215 receives an upward displacement and the glass then flows through the orifice 214. When the desired quantity of glass has been poured, the shaft 217 is displaced by the wheel 5 and causes the plug 215 to descend and the shears 221 sever the thread of glass which issues from the pouring hole 214. In this position of the plug the upper orifice of the passage 219 presents itself opposite the port 220 and the cavity 218 is thus in communication with the apparatus for forming the vacuum, then, inside this cavity a diminution of pressure is produced under the influence of which the glass which fills the pouring hole 214 and which leaves the latter, is drawn back into this cavity by suction and is there re-heated until the next pouring operation.

It will of course be understood that the embodiments of the invention described above are given by way of example only and that the forms, dimensions, mechanical transmissions and so forth may vary without affecting the principle of the present installation.

Claims:

1. An automatic glass molding and blowing apparatus comprising a parison mold, a neck mold, a finishing mold, a dished-out first operation bottom mold arranged to cooperate with the parison mold, a second operation bottom mold arranged to cooperate with the finishing mold, cams revolving in the frame and arranged to reverse the parison mold after it has been filled with molten glass to present beneath it a bottom mold for convex shaping the lower part of the parison mold while it is being blown upon introducing compressed air through the neck mold to open the parison mold to withdraw the bottom mold in a direction corresponding with the axis of the parison mold and also transversely to this axis to substitute for it a second operation bottom mold to close the finishing mold around the second bottom mold and around the parison to actuate the opening of the valve which admits of air pressure for blowing the bottle to its finished shape, to open the finishing mold to withdraw the second bottom mold, to remove the bottom mold so as to allow the bottle to drop, and means for automatically stopping the above cams at predetermined points between the beginning and the end of the cycle.

2. Automatic glass molding and blowing apparatus comprising in combination a self-contained frame, mold operating organs carried by this frame, a receiving and cooling pot adapted to contain the bottle during nearly the entire cycle following its molding and blowing, means for ejecting the bottle from said pot just before the arrival of a new bottle, cams revolving on this frame, and means for stopping and starting these cams automatically at predetermined points between the beginning and the end of the cycle.

3. Automatic glass molding and blowing apparatus comprising in combination a self-contained frame, mold operating organs carried by this frame, a receiving and cooling pot adapted to contain the bottle during nearly the entire cycle following its molding and blowing, a device for pushing inward the bottom of the bottle while contained in this pot, means for ejecting the bottle from said pot just before the arrival of a new bottle, cams revolving on this frame, and means for stopping and starting these cams automatically at predetermined points between the beginning and the end of the cycle.

4. An automatic bottle molding and blowing machine comprising in combination a self-contained frame, a parison mold, a neck mold, a finishing mold, two bottom molds, a receiving and cooling pot beneath the finishing mold, cams revolving in said frame adapted to operate above molds at the required moments and means for stopping and starting the revolution of the cams at predetermined points between the beginning and the end of the cycle.

5. An automatic bottle molding and blowing machine comprising in combination a self-contained frame, a parison mold, a neck mold, a finishing mold, two bottom molds, a receiving and cooling pot beneath the finishing mold, a device coöperating with this cooling pot for pushing inwardly the bottom of the bottle, cams revolving in said frame adapted to coöperate above molds at the required moments and means for stopping and starting the revolution of the cams at predetermined points between the beginning and the end of the cycle.

6. An automatic bottle molding and blowing machine comprising in combination a self-contained frame, a parison mold, a neck mold, a finishing mold, two bottom molds, a receiving and cooling pot beneath the finishing mold, a device coöperating with this cooling pot for pushing inwardly the bottom of the bottle, means for ejecting the finished bottle from the cooling pot, cams revolving in said frame adapted to operate above molds at the required moments, and means for stopping and starting the revolution of the cams at predetermined points between the beginning and the end of the cycle.

7. An automatic bottle blowing machine comprising in combination a parison mold, a neck mold, a finishing mold, two bottom molds, a receiving and cooling pot, means for pushing the bottom of the bottle inwardly while contained in this pot, a device for removing the finished bottle from this cooling pot, and cams for operating the above molds and devices.

8. An automatic bottle blowing machine comprising in combination a parison mold, a neck mold, a finishing mold, two bottom molds, a receiving and cooling pot, means for pushing the bottom of the bottle inwardly while contained in this pot, means for reversing the cooling pot, and a device for removing the finished bottle from this cooling pot and means for operating the above molds and devices.

9. An automatic bottle blowing machine comprising in combination a parison mold, a neck mold, a finishing mold, two bottom molds, a receiving and cooling pot, means for pushing the bottom of the bottle inwardly while contained in this pot, and a device for removing the finished bottle from this cooling pot, revolving cams adapted to operate above molds and devices and means for stopping and starting the revolution of these cams at predetermined points between the beginning and the end of the cycle.

The foregoing specification of my installation for the mechanical production "of hollow glass ware" signed by me this twenty-fifth day of August 1913.

ARTHUR WILZIN.

Witnesses:
LUCIEN MEMMINGER,
RENÉ THIRIOT.